FREQUENCY MODULATION SYSTEM

Filed July 12, 1950

INVENTOR.
RAYMOND M. WILMOTTE
BY Hyman Hurwitz
his attorney.

United States Patent Office 2,758,202

Patented Aug. 7, 1956

2,758,202

FREQUENCY MODULATION SYSTEM

Raymond M. Wilmotte, Washington, D. C., assignor to Padevco, Inc., Washington, D. C., a corporation of Delaware Application July 12, 1950, Serial No. 173,344

3 Claims. (Cl. 250—10)

The present invention relates generally to systems for effecting remote control by means of wave energy, and more particularly to systems of this character in which remote control is effected by transmitting together with a frequency modulated carrier, an auxiliary carrier of constant frequency, and utilizing the beats between the carrier and the frequency modulations of the frequency modulated carrier to generate the control signal.

Suppose two signals, which may be represented, in respect to instantaneous values, by $$E_1 = \sin wt \quad E_2 = a \sin (w+q)\, t$$

where $a<1$ and $q$ is the instantaneous difference in the frequencies of the signals, and which may be positive or negative, at random, as time proceeds.

The sum of the two signals is $$E = E_1 + E_2 = R \sin (wt+\alpha) \tag{1}$$

where $$R^2 = 1 + a^2 + 2a \cos qt \tag{2}$$

and $$\tan \alpha = \frac{a \sin qt}{1 + a \cos qt} \tag{3}$$

Referring specifically to Figure 1 of the accompanying drawings, there is illustrated the vectors $E_1+E_2$, added together, and labelled in respect to the significance of the various parameters of Equations 1–3 inclusive. In the discussion which follows it is taken that $qt=0$ when $E_2$ is collinear with and directed in the same sense as $E_1$, i. e., at the crests of the beat frequencies.

It may be shown, then, that $$\frac{d(wt+\alpha)}{dt} = w + \frac{aq(a+\cos qt)}{R^2} \tag{4}$$

$$\frac{dR}{dt} = \frac{-aq \sin qt}{R} \tag{5}$$

$$= -a \sin \alpha \tag{6}$$

$$R\frac{d(wt+\alpha)}{dt} = Rw + \frac{aq(a+\cos wt)}{R} \tag{7}$$

(8)

$$\int_0^{\psi} \frac{Rd(wt+\alpha)}{dt} d(qt) = 2(1+a)E(\psi/2,k)w + [(1+a)E(\psi/2,k) - (1-a).F(\psi/2,k)]q$$

where $$k^2 = \frac{2a}{(+a)^2}$$

It is apparent from Equation 2 that $R^2$ varies with cos $qt$, which means that the resultant of the waves $E_1$ and $E_2$, varies in amplitude in accordance with a function which repeats itself $q$ times per second. The signal at frequency $q$ can readily be derived from the superposed waves by means of an amplitude detector, and the frequency $q$ then measured by means of a limiter and discriminator.

In accordance with the present invention the stronger of the two signals is frequency modulated in response to intelligence, as for example, by means of an audio wave. The weaker of the two waves is maintained at constant frequency, which may be selectively to one side or the other of the mean value of the frequency modulated wave, and preferably sufficiently displaced therefrom that the deviations of the stronger carrier will reach the frequencies assigned to the weaker carrier at relatively infrequent intervals. It follows that the beat frequency is frequency modulated in accordance with the modulations of the stronger signal, and that the original modulating or intelligence signal may be derived either from the stronger carrier, or from the beat frequency, by frequency discrimination. The phase of the intelligence signal as derived from the beat frequency is dependent, however, upon the absolute value of the frequency of the weaker carrier, i. e., upon whether the frequency of the weaker carrier is greater or less in absolute value than the mean value of the frequency of the strong carrier. Accordingly, the control isgnals may be transmitted in accordance with the invention, by selectively transmitting in conjunction with the strong carrier, a weak carrier of constant frequency, selected to be either above or below the mean value of the strong carrier, and at a remote receiver, the control signal may be derived by a process of comparison of phase of the modulation as derived from the beat frequency and as derived from the strong carrier.

It is, accordingly, a broad object of the present invention to provide a novel system of generating control signals at a remote location.

It is a further object of the present invention to provide a novel system for generating control signals at a remote location by utilizing the beat frequency between a frequency modulated carrier, and a weaker unmodulated carrier.

Another object of the invention resides in the provision of a system for generating remote control signals which utilizes the fact that the beat frequency between an unmodulated relatively weak carrier, and a frequency modulated relatively strong carrier, is itself frequency modulated in accordance with the modulations of the strong carrier, in a phase determined by the absolute value of the relatively weak carrier.

The above and still further features, objects and advantages of the invention will become apparent upon consideration of the following detailed description of a specific embodiment thereof, especially when taken in conjunction with the accompanying drawings, wherein.

Figures 1, 2, 3, 4, 5:
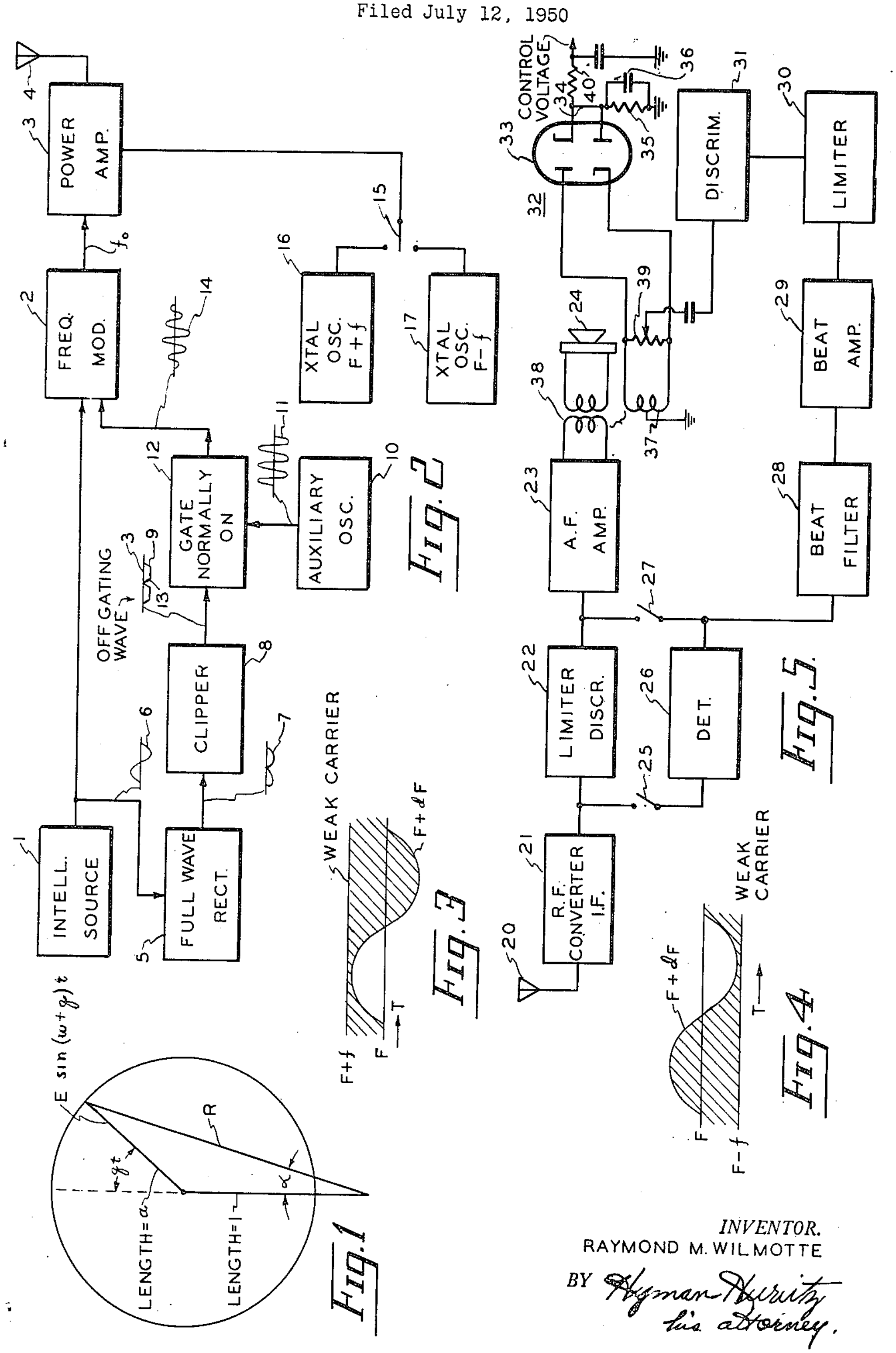
Figure 1 is a vector diagram of the alternating waves utilized in the system, and forms an illustrated basis for the above theoretical discussion of the principles of the invention.
Figure 2 is a block diagram of a transmitter arranged in accordance with the invention.
Figure 3 is a wave form diagram showing the character of the beat frequencies generated in the present system, when the relatively weak carrier is higher in absolute amplitude than the mean value of the frequency modulated stronger carrier.
Figure 4 is a modification of the system of Figure 3, wherein the relatively weak carrier is lower in absolute value; and, Figure 5 is a circuit diagram, partly in block and partly schematic, of a receiver arranged in accordance with the invention.

Reference is made to Figures 3 and 4 of the accompanying drawings, wherein the frequency F is the mean frequency of the stronger carrier, and wherein the frequency F suffers deviations $dF$ in response to the modulating signal. The weak carrier is displaced, in Figure 3, positively with respect to the frequency F, by an amount $f$ and in Figure 4 negatively by the same amount. It will be noted that so long as the displacement $f$ of the weak carrier is greater than the maximum deviation of the strong carrier that the difference between the two frequencies, $F+dF$ and either $F+f$ or $F-f$, representing the beat frequency between the two carriers, is at a frequency representative of the modulation of the strong carrier, and in the same phase in Figure 4, while in Figure 3 it is of opposite phase. It follows that the modulation may be derived either by demodulating the strong carrier, or by demodulating the frequency of the beat signal.

While the displacement $f$ of the weak carrier has been shown in Figures 3 and 4 as sufficiently great to place the weak carrier beyond the maximum deviation of the strong carrier, this is not essential to the present system, since the strong carrier seldom reaches or approaches its maximum deviations. As a further reason, account may be taken of the fact that the object of the present invention is to derive a control signal, and that transient inaccuracies of the modulation as derived from the beat frequencies, due to cross-over of the strong carrier, may be for that reason of substantially no importance.

Referring now to Figure 2 of the accompanying drawings, the reference numeral 1 identifies a source of intelligence, which may be an audio signal if desired, although the present invention is not limited in respect to the character of the intelligence transmitted thereby. The signal provided by the intelligence source 1 is applied to a frequency modulator 2, which supplies the strong carrier F, the latter subject to frequency deviations in response to the intelligence signal. The output of the frequency modulator 2 is applied to a power amplifier 3 and radiated by means of an antenna 4. The portion of Figure 2 hereinabove described corresponds with a conventional frequency modulation transmitter.

In accordance with the present invention there is provided a full wave rectifier 5 to which the intelligence signal as represented at 6 may be applied. The full wave rectifier 5 is arranged to provide output signals of a single polarity as at 7, and this polarity is selected to be negative. The wave form 7 is clipped in a clipper 8 to provide gating pulses of uniform amplitude 9, except at those positions of the gating wave at which the modulating signal 6 is extremely small or approaches zero values. An auxiliary oscillator 10 is provided, which may preferably be of supersonic frequency, say 25 k. c., but which may, if desired, be of sub-sonic frequency. The auxiliary oscillator 10 supplies its output, as illustrated at 11, to a gate 12 to which is also applied the gating wave 9, the latter controlling the conductive periods of the gate 12, and normally holding the gate 12 in non-conductive condition. Accordingly, the signal 11 is normally not passed through the gate 12, but when the gating wave 9 attains sufficiently small values, as at the notch position 13, corresponding with low values of intelligence signal 6, the gate 12 permits passage of signal 11, and this signal, appearing as at 14, is then applied to frequency modulator 2, and serves to produce frequency deviations of the strong carrier F. Accordingly the strong carrier F will be modulated in frequency with relatively high deviation at all times, regardless of the instantaneous value of the modulating signal 6, i. e. in response to the modulating signal 6 alone when the latter is sufficiently strong, and additionally by the auxiliary oscillator 10 at other times.

In addition to the strong carrier F, supplied by the frequency modulator 2, and subject to frequency deviation $dF$, there is supplied to the power amplifier 3 selectively as by means of a selective switch 15, the output of either of two crystal oscillators 16 or 17, the frequency of the crystal oscillator 16 being $F+f$ and that of the crystal oscillator 17 being $F-f$, and the output as applied from the oscillators 16 and 17 to the power amplifier 3 is arranged to be weak relative to the amplitude of the main carrier F. Accordingly, the signal radiated by the antenna 4 is represented in respect to wave form in Figure 3 or Figure 4.

The signals radiated by the antenna 4 may be received by means of a receiving antenna 20 and applied to an RF stage, converter and intermediate frequency amplifier 21, in accordance with the conventional practice. There will then be present at the output of the intermediate frequency amplifier both the weak and the strong signals, the combination of the two giving rise to the beats referred to hereinabove. The two signals are applied to a limiter-discriminator 22, which detects only the strong carrier, to the exclusion of the weaker carrier, as is well known to those skilled in the pertinent art. The output of the limiter-discriminator 22 corresponds then with the modulating signal, or with the signal provided by the intelligence source 1, and may be amplified by a suitable amplifier 23, and if this signal is of audio character applied to a speaker 24. The channel comprising elements 21 to 24, inclusive, corresponds then with a conventional frequency modulation receiver.

At the output of the intermediate frequency amplifier there is present the strong and the weaker carrier in superposition, the envelope of the combination including beats at the difference frequency between the two carriers, provided that no limiting occurs in the intermediate frequency amplifier 21. In the latter event the combined signals may be applied via a switch 25 to an amplitude detector 26, which derives the beat frequencies. If substantial limiting takes place in the intermediate frequency amplifier, the beats may be derived from the output of the limiter and discriminator 22 by means of a lead including a selector switch 27. In either case the beat frequencies are applied to a beat filter 28, which may, if desired, be a high pass filter, cutting off at the low end at about 15 kc. and serving thereby to eliminate audio frequency signals which are present at the output of the limiter-discriminator 22 and which are thus available to the beat filter 28 when the beat signals are derived from the limiter-discriminator 22. In the event the beat signals are derived from the detector 26, the beat filter may prove to be unnecessary.

It will be recalled that the beat frequencies may derive from maximum deviations of 75 kc., which is standard in frequency modulation broadcast technique at the present day, and thus may include frequencies up to 150 kc., and down to zero cycles. The beat filter 28 eliminates the beat frequencies falling below 15 kc., and passes the remainder of the signals to a beat amplifier 29, to an amplitude limiter 30, and finally to a beat frequency discriminator 31. The output of the latter corresponds quite closely in wave form to the modulating signals 6, and is applied to a phase comparison device 32.

The phase comparison device 32 contains a pair of back-to-back diodes 33, one cathode and anode of which are tied together at 34 and connected to a resistance load circuit 35, by-passed by a condenser 36. The remaining anode and cathode are connected in push-pull relation with a winding 37, which is coupled to a further winding 38 in the output of audio amplifier 23, the winding 37 being shunted by a resistance 39, and the center point of winding 37 being grounded.

The output of the discriminator 31 is applied, accordingly, in parallel to the back-to-back diodes 33, while the audio frequency deriving from the audio frequency amplifier 23 is applied, via the windings 37 and 38, in push-pull relation to the diodes 33. In the absence of any output from discriminator 31 the back-to-back diodes 33 serve to develop no output in the load circuit 35 in response to signal supplied by winding 37. When signal is available from the discriminator 31 on the other hand, voltage is developed across the load resistance 35, this voltage having a polarity depending upon the relative phases of the signals supplied from the discriminator 31 and the winding 37. The voltage available across the load resistance 35 is of variable amplitude, however, corresponding generally in wave shape with the audio signal 6, and accordingly a long time constant smoothing circuit 40 is provided, which develops a relatively constant voltage in response to the varying voltage developed across load resistance 35, and which is suitable for use as a control signal. The control signal so developed may be utilized for any desired purpose.

While I have described and illustrated specific forms of the invention it will be clear that variations thereof may be resorted to without departing from the true scope of the invention as defined in the appended claims.

What I claim and desire to secure by Letters Patent of the United States is:

1. In combination, a source of relatively strong carrier wave having a mean frequency, a source of intelligence signal, means for modulating said relatively strong carrier wave in response to said intelligence signal, a source of relatively weak carrier wave having a frequency displaced from said mean frequency, means for transmitting said carrier waves in a common channel, a receiver for said carrier waves, said receiver comprising means responsive to said relatively strong carrier wave for detecting said intelligence to provide a detected intelligence signal, means responsive to the frequency of the beats between said carrier waves for developing a comparison signal, and means responsive jointly to said detected intelligence signal and said comparison signal for generating a control voltage.

2. The combination in accordance with claim 1 wherein said means responsive jointly to said detected intelligence signal and said comparison signal is a phase comparison device.

3. In a system wherein is transmitted a relatively strong frequency modulated carrier and a relatively weak carrier of steady frequency non-coincident with the mean frequency of said relatively strong carrier, means for deriving from the beats between said carriers a first alternating signal, means for deriving from said relatively strong frequency modulated carrier only a further signal corresponding generally in wave shape with said alternating signal, and means controlled in accordance with the phase between said alternating signals to generate a control signal.

References Cited in the file of this patent

UNITED STATES PATENTS

| | | |
|---|---|---|
| 1,450,966 | Affel | Apr. 10, 1923 |
| 1,607,158 | Hammond | Nov. 16, 1926 |
| 1,629,685 | Ditcham | May 24, 1927 |
| 2,378,013 | Hilferty | June 12, 1945 |
| 2,379,720 | Koch | July 3, 1945 |
| 2,479,305 | Brown | Aug. 16, 1949 |